A. Shellenberger.
Hay Fork.
No. 104,365. Patented June 14, 1870.
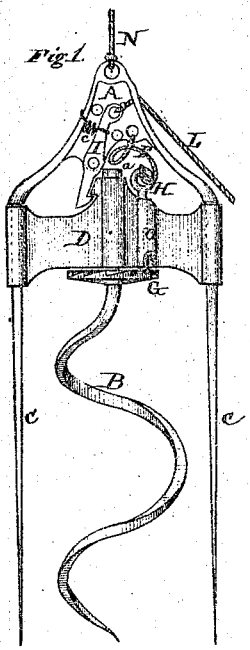
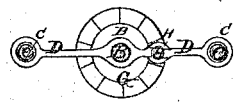
Witnesses.
Harry King
C. L. Evert
Inventor.
Amos Shellenberger
Alexander Mason
Atty.

United States Patent Office.

AMOS SHELLENBERGER, OF VERSAILLES, OHIO, ASSIGNOR TO HIMSELF AND JOSEPH Z. LIGIER, OF SAME PLACE.

Letters Patent No. 104,365, dated June 14, 1870.

IMPROVEMENT IN HORSE HAY-FORKS.

The Schedule referred to in these Letters Patent and making part of the same

*To all whom it may concern:*

Be it known that I, AMOS SHELLENBERGER, of Versailles, in the county of Darke and in the State of Ohio, have invented certain new and useful Improvements in Horse Hay-Forks; and do hereby declare that the following is a full, clear, and exact description thereof, reference being had to the accompanying drawing and to the letters of reference marked thereon making a part of this specification.

The nature of my invention consists in the construction of a horse hay-fork, the tine of which is shaped like a screw, and is provided with a ratchet which prevents it from discharging its load until it is tripped, as will hereafter be more fully set forth and explained.

Figure 1 is a side elevation of my invention.

Figure 2 is a plan view of the ratchet.

Letter A represents the frame to which the fork B is attached, and which has two sharp-pointed tines C, extending downward, one on each side of the fork, which serve not only as a guide to direct the fork in rising and falling, but also serves to prevent the hay from slipping off the screw, while being raised.

The fork B consists of a long, tapering, sharp-pointed metal bar, which is shaped like a screw, and has its upper end secured in the guide D by means of the nut $a$.

Near the top of the screw there is secured a round plate, G, which has its top cut so as to form a ratchet, into which the dog H catches, so as to prevent the screw from turning around after it has been driven into the load.

This dog consists of a metal rod, which passes downward through the guide D, having its lower end shaped so that the ratchet can turn freely in one direction, but not in the opposite one, and has a small lug formed on its side, which catches against a small shoulder formed on the inside of the opening in the guide, through which the dog passes, so as to prevent the fork from falling further than just the length of the cord F, which connects the dog to the frame A.

Pivoted to one side of the frame is a catch, I, near the top of which is secured a small spring, $c$, which serves to draw the catch back into place after having been moved to one side by the trip-cord L, which is tied to its upper end.

The guide D consists of a flat metal plate, extending from tine to tine, on which it slides, and has a notch cut in its top, in which the catch I hooks, so as to support the fork.

When it is desired to load the fork, the whole frame is dropped upon the hay, when the fork is turned until it has taken up a sufficient load, when the hoisting power is applied to the rope N. After it has been raised to a sufficient height, the trip-cord is pulled, which loosens the guide D and allows the load to fall to the length of the cord F, when the weight alone, will be sufficient to cause the fork to revolve and drop the load.

Having thus described my invention,

What I claim, and desire to secure by Letters Patent, is—

1. The cross-head D, carrying the spiral fork B, and sliding upon the tines C C, its downward motion being checked by the lugged or shouldered dog H and cord F, substantially as herein set forth.

2. In combination with the sliding cross-head D, the catch I, spring $c$, and trip-rope L, substantially as and for the purposes herein set forth.

3. The combination and arrangement of the frame A, tines C C, cross-head D, screw B, ratchet G, dog H, and catch I, with their cords F L N, all substantially as and for the purposes herein set forth.

In testimony that I claim the foregoing, I have hereunto set my hand this 2nd day of October, 1869.

AMOS SHELLENBERGER.

Witnesses:
JOSEPH Z. LIGIER,
FRANCIS KUSNICK.